United States Patent
Osano et al.

(10) Patent No.: US 11,214,680 B2
(45) Date of Patent: Jan. 4, 2022

(54) POLYBUTYLENE TEREPHTHALATE RESIN COMPOSITION AND MOLDED ARTICLE

(71) Applicant: WinTech Polymer Ltd., Tokyo (JP)

(72) Inventors: Keiichi Osano, Fuji (JP); Kouichi Sakata, Fuji (JP)

(73) Assignee: POLYPLASTICS CO., LTD., Tokyo (JP)

( * ) Notice: Subject to any disclaimer, the term of this patent is extended or adjusted under 35 U.S.C. 154(b) by 7 days.

(21) Appl. No.: 16/331,389

(22) PCT Filed: Aug. 28, 2017

(86) PCT No.: PCT/JP2017/030798
§ 371 (c)(1),
(2) Date: Mar. 7, 2019

(87) PCT Pub. No.: WO2018/047662
PCT Pub. Date: Mar. 15, 2018

(65) Prior Publication Data
US 2019/0249003 A1    Aug. 15, 2019

(30) Foreign Application Priority Data

Sep. 12, 2016  (JP) .............................. JP2016-177967

(51) Int. Cl.
| | | |
|---|---|---|
| *C08L 67/02* | (2006.01) | |
| *C08K 7/14* | (2006.01) | |
| *C08L 83/04* | (2006.01) | |
| *C08G 77/04* | (2006.01) | |
| *C08L 23/08* | (2006.01) | |
| *C08L 33/08* | (2006.01) | |

(52) U.S. Cl.
CPC .............. *C08L 67/02* (2013.01); *C08G 77/04* (2013.01); *C08K 7/14* (2013.01); *C08L 23/08* (2013.01); *C08L 23/0869* (2013.01); *C08L 33/08* (2013.01); *C08L 83/04* (2013.01); *C08L 2205/03* (2013.01)

(58) Field of Classification Search
None
See application file for complete search history.

(56) References Cited

U.S. PATENT DOCUMENTS

| | | | |
|---|---|---|---|
| 6,447,913 B1 | 9/2002 | Watanabe et al. | |
| 6,660,789 B2 * | 12/2003 | Uno ........................ | C08L 67/02 524/267 |
| 2002/0188073 A1 | 12/2002 | Uno et al. | |
| 2006/0142438 A1 * | 6/2006 | Ishii ........................ | C08L 67/02 524/100 |

FOREIGN PATENT DOCUMENTS

| | | |
|---|---|---|
| CN | 101139438 A | 3/2008 |
| JP | 2002-356611 A | 12/2002 |
| JP | 2005-133087 A | 5/2005 |
| WO | 00/78867 A1 | 12/2000 |
| WO | 2006/090751 A1 | 8/2006 |

OTHER PUBLICATIONS

Machine-generated translation of JP 2005-133087 (no date).*
International Search Report dated Nov. 28, 2017, issued in counterpart International Application No. PCT/JP2017/030798 (2 pages).
Office Action dated Dec. 11, 2020, in counterpart Chinese application No. 201780055719.7 with partial English translation (8 page).

* cited by examiner

*Primary Examiner* — Marc S Zimmer
(74) *Attorney, Agent, or Firm* — Westerman, Hattori, Daniels & Adrian, LLP

(57) ABSTRACT

A polybutylene terephthalate resin composition containing a polybutylene terephthalate resin, a silicone-based compound having a kinematic viscosity at 25° C. of 1,000 to 10,000 cSt in an amount of 0.5 to 1.8% by mass of the total mass of the polybutylene terephthalate resin composition, and an olefin-based elastomer in an amount of 5 to 20% by mass of the total mass of the polybutylene terephthalate resin composition.

8 Claims, 1 Drawing Sheet

POLYBUTYLENE TEREPHTHALATE RESIN COMPOSITION AND MOLDED ARTICLE

TECHNICAL FIELD

Embodiments of the present invention relate to a polybutylene terephthalate resin composition and a molded article.

BACKGROUND ART

As crystalline thermoplastic resins, polybutylene terephthalate resins have excellent mechanical strength, electrical properties and various other characteristics, and are consequently used as engineering plastics in a wide range of applications, including in vehicles and electrical and electronic equipment. However, polybutylene terephthalate resins tend to have low long-term durability relative to alkali solutions, limiting the potential usage environments and applications.

For example, some components may be used in locations where they make contact with toilet detergents, bathtub detergents, bleaching agents, or snow melting agents or the like. These types of chemical reagents tend to include, for example, sodium hydroxide, sodium hypochlorite, sodium percarbonate and/or calcium chloride, as a component thereof meaning the resin molded article is exposed to an alkali environment. If a resin molded article is exposed to the above type of alkali environment for a long period of time in a state of excessive strain due to screw closure, metal press fitting, or caulking or the like, then the joint effects of the strain and the alkali components may cause so-called environmental stress cracking, resulting in the occurrence of cracking in the molded article.

Further, polybutylene terephthalate resins are also widely used in insert molded articles in which a metal or an inorganic solid (hereafter also referred to as a "metal or the like") is inserted into the resin, but in these types of insert molded articles, so-called welds occur at the interfaces where the resin flows around the metal or the like and then converges during the injection molding process, and the type of environmental stress cracking described above generally tends to occur more frequently at these welds of the molded article. Moreover, because the shrinkage rates and coefficients of linear expansion differ for the resin and the metal or the like, insert molded articles that are used in environments that are exposed to repeated temperature increases and decreases tend to be prone to cracking (heat shock fracture) of the resin surrounding the metal or the like due to the strain that develops. Accordingly, when insert molded articles make contact with the alkali solution described above, and are exposed for long periods to environments that undergo repeated temperature increases and decreases, cracking may occur at the welds or at locations surrounding the metal or the like, which may be problematic.

One known countermeasure for suppressing the occurrence of cracking in insert molded articles that make contact with the alkali solutions described above involves adding a silicone-based compound and/or a fluorine-based compound. Further, another known countermeasure involves adding a shock resistance-imparting agent such as an elastomer in order to minimize the effects of strain caused by temperature variations.

For example, WO 2000/078867 discloses a thermoplastic polyester resin composition containing a thermoplastic polyester resin (A) blended with a shock resistance-imparting agent (B), a silicone-based compound and/or fluorine-based compound (C), an inorganic filler (D) and a polyfunctional compound (E).

Further, the above document WO 2000/078867 also discloses thermoplastic polyester resin compositions containing prescribed amounts of a polybutylene terephthalate resin as the thermoplastic polyester resin (A), a graft copolymer of an ethylene-ethyl acrylate copolymer and a methyl methacrylate-butyl acrylate copolymer (namely. EEA-g-BA/MMA), an acrylic-based core-shell polymer, an epoxidized styrene-butadiene-styrene copolymer (ESBS), or a graft copolynmer of an ethylene-glycidyl methacrylate copolymer and methyl methacrylate (EGMA-g-MMA) as the shock resistance-imparting agent (B), a silicone oil-containing silicone powder as the silicone-based compound and/or fluorine-based compound (C), glass fiber as the inorganic filler (D), and an epoxy resin as the polyfunctional compound (E), and discloses that by using these thermoplastic resin compositions, molded articles having excellent alkali resistance can be obtained.

CITATION LIST

Patent Literature

Patent Document 1: WO 2000/078867

SUMMARY OF THE INVENTION

Technical Problem

However, as the lifespan of products lengthens, further improvements in the alkali resistance and heat shock resistance of components would be desirable.

It is an object of embodiments of the present invention to provide a polybutylene terephthalate resin composition with which molded articles having excellent alkali resistance and heat shock resistance can be molded.

Solution to Problem

One embodiment of the present invention relates to a polybutylene terephthalate resin composition containing a polybutylene terephthalate resin, a silicone-based compound having a kinematic viscosity at 25° C. of 1,000 to 10,000 cSt in an amount of 0.5 to 1.8% by mass of the total mass of the polybutylene terephthalate resin composition, and an olefin-based elastomer in an amount of 5 to 20% by mass of the total mass of the polybutylene terephthalate resin composition.

Another embodiment of the present invention relates to a molded article molded using the polybutylene terephthalate resin composition described above.

Advantageous Effects of the Invention

According to embodiments of the present invention, it is possible to provide a polybutylene terephthalate resin composition with which molded articles having excellent alkali resistance and heat shock resistance can be molded, and a molded article molded using the polybutylene terephthalate resin composition.

DESCRIPTION OF EMBODIMENTS

Figure 1:
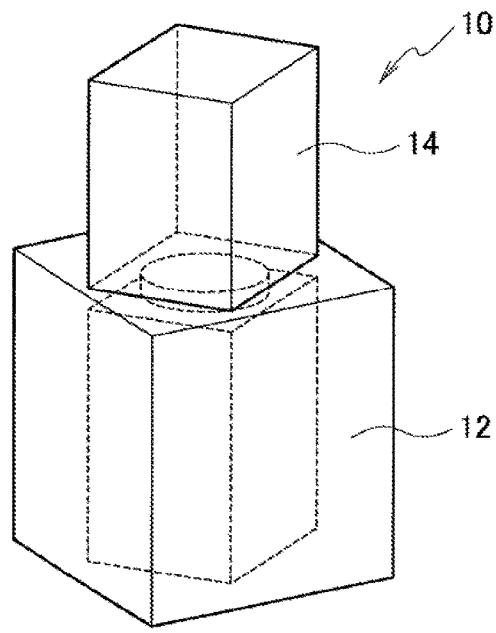
FIG. 1 is a (partially see-through) perspective view illustrating one example of an insert molded article.

Preferred embodiments of the present invention are described below, but the present invention is in no way limited by the following embodiments.

<Polybutylene Terephthalate Resin Composition>

A polybutylene terephthalate resin according to one embodiment of the present invention (hereafter sometimes referred to as simply "the resin composition") contains a polybutylene terephthalate resin, a specific amount of a silicone-based compound having a kinematic viscosity at 25° C. of 1,000 to 10,000 cSt, and a specific amount of an olefin-based elastomer. Using this resin composition, a molded article having excellent alkali resistance and heat shock resistance can be molded.

Each of the components that can be used in the resin composition of the above embodiment is described below.

(A) Polybutylene Terephthalate Resin

The polybutylene terephthalate resin (PBT resin) (A) is a polybutylene terephthalate-based resin obtained by a polycondensation of a dicarboxylic acid component containing at least terephthalic acid or an ester-forming derivative thereof (such as a $C_1$ to $C_6$ alkyl ester or an acid halide), and a glycol component containing at least an alkylene glycol of 4 carbon atoms (1,4-butanediol) or an ester-forming derivative thereof (such as an acetylated product). The polybutylene terephthalate resin (A) is not limited to homopolybutylene terephthalate resins, and may be a copolymer containing at least 60 mol % (and particularly at least 75 mol % but not more than 95 mol %) of butylene terephthalate units.

There are no particular limitations on the amount of terminal carboxyl groups in the polybutylene terephthalate resin (A), provided the effects of the present invention are not impaired. The amount of terminal carboxyl groups in the polybutylene terephthalate resin (A) is preferably at least 5 meq/kg but not more than 30 meq/kg, and is more preferably at least 10 meq/kg but not more than 25 meq/kg. By using a polybutylene terephthalate resin having an amount of terminal carboxyl groups within this range, the resulting polybutylene terephthalate resin composition becomes less prone to any deterioration in strength caused by hydrolysis under hot moist conditions.

The intrinsic viscosity (IV) of the polybutylene terephthalate resin (A) is at least 0.60 dL/g but not more than 1.20 dL/g, more preferably at least 0.65 dL/g but not more than 1.00 dL/g, even more preferably at least 0.70 dL/g but not more than 0.95 dL/g, and still more preferably at least 0.75 dug but not more than 0.90 dL/g. When a polybutylene terephthalate resin having an intrinsic viscosity within the above range is used, the obtained polybutylene terephthalate resin composition exhibits particularly superior external appearance and strength. Further, the intrinsic viscosity may be adjusted by blending polybutylene terephthalate resins having different intrinsic viscosities. For example, a polybutylene terephthalate resin having an intrinsic viscosity of 1.0 dL/g and a polybutylene terephthalate having an intrinsic viscosity of 0.7 dL/g may be blended together to prepare a polybutylene terephthalate resin having an intrinsic viscosity of 0.85 dL/g. The intrinsic viscosity (IV) of the polybutylene terephthalate resin (A) can be measured, for example, in o-chlorophenol at a temperature of 35° C.

In the polybutylene terephthalate resin (A), examples of dicarboxylic acid components (comonomer components) that may be used besides terephthalic acid and ester-forming derivatives thereof include $C_8$ to $C_{14}$ aromatic dicarboxylic acids such as isophthalic acid, phthalic acid, 2,6-naphthalenedicarboxylic acid and 4,4'-dicarboxydiphenyl ether; $C_4$ to $C_{16}$ alkane dicarboxylic acids such as succinic acid, adipic acid, azelaic acid and sebacic acid, $C_5$ to $C_{10}$ cycloalkane dicarboxylic acids such as cyclohexanedicarboxylic acid; and ester-forming derivatives (such as $C_1$ to $C_6$ alkyl ester derivatives and acid halides) of these dicarboxylic acid components. These dicarboxylic acid components may be used individually, or a combination of two or more components may be used.

Among these dicarboxylic acid components, more preferable examples include $C_8$ to $C_{12}$ aromatic dicarboxylic acids such as isophthalic acid, and $C_6$ to $C_{12}$ alkane dicarboxylic acids such as adipic acid, azelaic acid and sebacic acid.

In the polybutylene terephthalate resin (A), examples of glycol components (comonomer components) that may be used besides 1,4-butanediol include $C_2$ to $C_{10}$ alkylene glycols such as ethylene glycol propylene glycol, trimethylene glycol, 1,3-butylene glycol hexamethylene glycol, neopentyl glycol and 1,3-octanediol; polyoxyalkylene glycols such as diethylene glycol, triethylene glycol and dipropylene glycol, alicyclic diols such as cyclohexanedimethanol and hydrogenated bisphenol A; aromatic diols such as bisphenol A and 4,4'-dihydroxybiphenyl; $C_2$ to $C_4$ alkylene oxide adducts of bisphenol A such as an ethylene oxide 2 mol adduct of bisphenol A and a propylene oxide 3 mol adduct of bisphenol A; and ester-forming derivatives (such as acetylated products) of these glycols. One type of these glycol components may be used singly, or a combination of two or more types may be used.

Among these glycol components, more preferable examples include $C_2$ to $C_6$ alkylene glycols such as ethylene glycol and trimethylene glycol, polyoxyalkylene glycols such as diethylene glycol, and alicyclic diols such as cyclohexanedimethanol.

Examples of comonomer components that may be used besides the dicarboxylic acid component and the glycol component include aromatic hydroxycarboxylic acids such as 4-hydroxybenzoic acid, 3-hydroxybenzoic acid, 6-hydroxy-2-naphthoic acid and 4-carboxy-4'-hydroxybiphenyl; aliphatic hydroxycarboxylic acids such as glycolic acid and hydroxycaproic acid; $C_3$ to $C_{12}$ lactones such as propiolactone, butyrolactone, valerolactone and caprolactones (such as ε-caprolactone); and ester-forming derivatives (such as $C_1$ to $C_6$ alkyl ester derivatives, acid halides and acetylated derivatives) of these comonomer components.

The polybutylene terephthalate copolymers obtained by copolymerizing the components described above can each be used favorably as the polybutylene terephthalate resin (A). A combination of a homopolybutylene terephthalate polymer and a polybutylene terephthalate copolymer may be used as the polybutylene terephthalate resin (A).

(B) Silicone-Based Compound

By including the silicone-based compound (B), the polybutylene terephthalate resin composition of the present embodiment is able to exhibit superior alkali resistance.

Examples of preferred silicone-based compounds include, but are not limited to, compounds generally known as silicone oils, including pure silicone resins such as dimethylpolysiloxane, methylphenylpolysiloxane and diphenylpolysiloxane, and modified silicones obtained by reacting a pure silicone resin with a resin for modification such as an alkyd resin, polyester resin, acrylic resin or epoxy resin.

A cured silicone powder containing an absorbed silicone oil (hereafter sometimes referred to as a "silicone oil-absorbed cured silicone powder") may be used. For example, a powder obtained by first adding and absorbing 0.5 to 80% by weight of a silicone oil into a finely powdered cured silicone, and then performing powdering by an arbitrary method may be used as a silicone oil-absorbed cured silicone powder.

Examples of silicones that may be used for absorbing a silicone oil to form a cured silicone powder include conventionally known silicone rubbers and silicone gels.

Examples of the silicone oil include oils represented by general formula (1) shown below. In the following general formula (1), R represents a substituted or unsubstituted monovalent hydrocarbon group or a hydroxyl group, and n is an integer.

$$R_3SiO[R_2SiO]_nSiR_3 \quad (1)$$

In the above general formula (1), R represents a substituted or unsubstituted monovalent hydrocarbon group or a hydroxyl group, and examples of the substituted or unsubstituted monovalent hydrocarbon group include alkyl groups such as a methyl group, ethyl group and propyl group; alkenyl groups such as a vinyl group and allyl group; cycloalkyl groups; aralkyl groups such as a β-phenylethyl group; as well as a 3,3,3-trifluoropropyl group, 3-mercaptopropyl group, 3-aminopropyl group and 3-glycidoxypropyl group.

In the present embodiment, the kinematic viscosity at 25° C. of the silicone-based compound (B) is within a range from 1,000 to 10,000 cSt (10 to 100 cm²/s), and is preferably from 2,000 to 8,000 cSt, and even more preferably from 3,000 to 6,000 cSt. In those cases where an aforementioned silicone oil-absorbed cured silicone powder is used, a silicone oil having a kinematic viscosity that falls within the above range may be used as the silicone oil that is absorbed.

A single type of silicone-based compound (B) may be used alone, or a combination of two or more types may be used.

The amount of the silicone-based compound (B) is at least 0.5% by mass but not more than 1.8% by mass of the total mass of the polybutylene terephthalate resin composition, and is preferably at least 0.5% by mass but not more than 1.5% by mass, more preferably at least 0.7% by mass but not more than 1.5% by mass, and even more preferably at least 0.8% by mass but not more than 1.3% by mass. In those cases in which the amount of the silicone-based compound (B) is at least 0.5% by weight, an alkali resistance improvement effect can be obtained, whereas in those cases in which the amount is not more than 1.8% by mass, a problem caused by bleeding from the molded article may be less likely to occur.

(C) Olefin-Based Elastomer

The polybutylene terephthalate resin composition of the present embodiment contains an olefin-based elastomer in an amount of at least 5% by mass but not more than 20% by mass of the total mass of the polybutylene terephthalate resin composition.

The amount of the olefin-based elastomer (C) is, for example, preferably at least 7% by mass, more preferably at least 8% by mass, and even more preferably 9% by mass or greater, of the total mass of the polybutylene terephthalate resin composition, and is preferably not more than 18% by mass, more preferably not more than 17% by mass, and even more preferably 16% by mass or less. In those cases in which the amount of the olefin-based elastomer (C) falls within the above range, it is possible to improve the alkali resistance and the heat shock resistance with favorable balance.

Conventionally known olefin-based elastomers may be used as the olefin-based elastomer (C). Examples of conventionally known olefin-based elastomers include ethylene-propylene copolymers (EP copolymers), ethylene-propylene-diene copolymers (EPD copolymers), copolymers containing at least one type of unit selected from among EP copolymers and EPD copolymers, and copolymers of an olefin and a (meth)acrylic-based monomer. Preferred examples of olefin-based elastomers include EP copolymers, EPD copolymers, and copolymers of an olefin and a (meth) acrylic-based monomer. Of these, copolymers of an olefin and a (meth)acrylic-based monomer are preferred. Among copolymers of an olefin and a (meth)acrylic-based monomer, EEA copolymers (ethylene-ethyl acrylate copolymers) are particularly preferred.

An EEA copolymer is a copolymer formed using ethylene and ethyl acrylate as copolymerization components. There are no particular limitations on the form of the copolymerization, and random, block or graft copolymers may all be used, or the copolymer may have two or more partial structures selected from among random structures, block structures and graft structures.

There are no particular limitations on the ratio between ethylene and ethyl acrylate in the copolymer, but from the viewpoints of ensuring good compatibility with the PBT resin and suppressing blocking during production, the melting point of the EEA copolymer is preferably at least 85° C. more preferably at least 88° C., and particularly preferably 90° C. or higher.

In the present embodiment, it is preferable to use an EEA copolymer that contains substantially no comonomer components besides the ethylene and ethyl acrylate, but the copolymer may contain a portion of other comonomer components, provided the effects of the present embodiment are not impaired. Specifically, the amount of comonomers besides the ethylene and ethyl acrylate is preferably not more than 10% by mass of all the copolymerization monomers. Examples of these other comonomers include maleic anhydride, butyl acrylate and (meth)acrylate esters such as methyl methacrylate, and comonomers that do not contain a highly reactive functional group such as a glycidyl group are preferred.

The EEA copolymer may be produced using any arbitrary method. For example, the EEA copolymer can be obtained by mixing prescribed amounts of ethylene and ethyl acrylate (and any other comonomer components), and then using a radical initiator to conduct a radical polymerization by a typical method.

A single type of olefin-based elastomer may be used alone, or a combination of two or more types may be used.

(D) Filler

The polybutylene terephthalate resin composition of the present embodiment may contain a filler (D). By including the filler (D), the mechanical properties can be improved. Further, by reducing the molding shrinkage rate and the coefficient of linear expansion for the polybutylene terephthalate resin composition, further improvement in the heat shock resistance can also be expected.

Examples of the filler of component (D) include fibrous fillers [for example, inorganic fibers such as glass fiber, asbestos fiber, carbon fiber, silica fiber, alumina fiber, silica-alumina fiber, zirconia fiber, boron nitride fiber, silicon nitride fiber, boron fiber, potassium titanate fiber, silicon carbide fiber and whiskers (such as whiskers of, for example, silicon carbide, alumina, and/or silicon nitride), and organic fibers formed using, for example, a polyamide and/or a fluororesin], plate-like fillers [for example, talc, mica, glass flakes and graphite] and powdered fillers [for example, glass beads, glass powder, milled fibers (such as milled glass fiber) and wollastonite]. Among these fillers, more preferable examples include glass-based fillers (such as glass fiber, glass flakes and glass beads), talc, mica, and wollastonite. Among these, glass fiber may be favorable in terms of ease of availability, strength and rigidity. Further, plate-like fillers and powdered fillers may be favorable in terms of suppressing anisotropy of the mold shrinkage rate and linear expansion coefficient of the polyalkylene terephthalate resin composition. When using the filler, conventional surface treatment agents may be used as required.

When a fibrous filler is used as the component (D), there are no particular limitations on the shape thereof, and, the length may be, for example, from about 100 µm to about 5 mm, and is more preferably, from about 500 µm to about 3 mm, and the diameter may be, for example, from about 1 µm to about 50 µm, and is more preferably about 3 µm to about 30 µm. When a plate-like filler or powdered filler is used, there are no particular limitations on the average particle size of thereof, but, the average particle size may be, for example, from about 0.1 µm to about 100 µm, and is more preferably from about 0.1 µm to about 50 µm. One type of the filler (C) may be used singly, or a combination of two or more types may be used.

The amount added of the filler of the component (D) is preferably at least 10% by mass but not more than 50% by mass, more preferably at least 15% by mass but not more than 40% by mass, and even more preferably at least 20 parts by mass but not more than 35 parts by mass, of the total mass of the polybutylene terephthalate resin composition. By using an amount within this range, the heat shock resistance can be improved without significantly impairing the fluidity of the resin composition.

(E) Other Components

The polybutylene terephthalate resin composition of the present embodiment may, depending on the intended purpose also include one or more other optional component besides the polybutylene terephthalate resin (A), the silicone-based compound (B), the olefin-based elastomer (C) and the filler (D) described above. Examples of the other component (E) include, but are not limited to, antioxidants, stabilizers, molecular weight adjusters, ultraviolet absorbers, antistatic agents, colorants, lubricants, mold release agents, crystallization promoters, crystal nucleating agents, infrared absorbers, flame retardants, flame retardant assistants, hydrolysis resistance improvers, and fluidity improvers.

In the polybutylene terephthalate resin composition of the present embodiment, the combined mass of the above components (A) to (D) preferably represents at least 70% by mass, more preferably at least 80% by mass, and even more preferably 90% by mass or more, of the total mass of the composition.

There are no particular limitations on the upper limit for this value, which may be 100% by mass. By ensuring that the combined mass of the above components (A) to (D) falls within the above range, a resin composition having particularly superior alkali resistance and heat shock resistance can be obtained.

The polybutylene terephthalate resin composition can be produced by any of the various methods known as methods for producing thermoplastic resin compositions. Examples of favorable methods include methods in which a melt kneading apparatus such as single-screw or twin-screw extruder is used to melt and knead the components and then extrude the composition to form pellets.

<Molded Article>

Next is a description of a molded article formed using the polybutylene terephthalate resin composition described above.

One embodiment of the present invention relates to a molded article molded using the polybutylene terephthalate resin composition described above.

This molded article may, for example, contain only a resin portion formed using the above polybutylene terephthalate resin composition, or, for example, as described below, may contain a resin portion formed using the above polybutylene terephthalate resin composition and an insert member containing a metal and/or an inorganic solid.

There are no particular limitations on the method used for obtaining a molded article using the polybutylene terephthalate resin composition, and conventional methods may be employed. For example, the molded article can be obtained by injection molding of the polybutylene terephthalate resin composition. In one example of this type of method, pellets prepared by subjecting the components of the polybutylene terephthalate resin composition to melt kneading and extrusion are supplied to an injection molding apparatus fitted with a predetermined mold, and injection molding is then performed to form a molded article.

The molded article of the present embodiment may also be formed as an insert molded article by performing injection molding of the polybutylene terephthalate resin composition described above together with an insert member containing a metal and/or an inorganic solid.

The molded article of the present embodiment exhibits excellent alkali resistance and heat shock resistance, and can therefore be used particularly favorably as a molded article (and preferably an insert molded article) that is used as a component that makes contact with alkali solutions.

Embodiments of the present invention include the embodiments described below, but the present invention is not limited to the following embodiments.

<1> A polybutylene terephthalate resin composition containing:
a polybutylene terephthalate resin,
a silicone-based compound having a kinematic viscosity at 25° C. of 1,000 to 10,000 cSt, in an amount of 0.5 to 1.8% by mass of the total mass of the polybutylene terephthalate resin composition, and
an olefin-based elastomer in an amount of 5 to 20% by mass of the total mass of the polybutylene terephthalate resin composition.

<2> The polybutylene terephthalate resin composition according to <1>, wherein the silicone-based compound contains a dimethylpolysiloxane.

<3> The polybutylene terephthalate resin composition according to <1> or <2>, wherein the olefin-based elastomer contains an ethylene-ethyl acrylate copolymer.

<4> The polybutylene terephthalate resin composition according to any one of <1> to <3>, further containing a filler in an amount of 10 to 50%/o by mass of the total mass of the polybutylene terephthalate resin composition.

<5> The polybutylene terephthalate resin composition according to <4>, wherein the filler contains glass fiber.

<6> A molded article molded using the polybutylene terephthalate resin composition according to any one of <1> to <5>.

<7> The molded article according to <6>, which is an insert molded article containing an insert member containing at least one selected from the group consisting of a metal and an inorganic solid.

<8> The molded article according to <6> or <7>, which is used in a component that makes contact with an alkali solution.

The entire content of prior Japanese Patent Application 2016-177967 is incorporated within the present description by reference.

Examples

The present invention is described below in further detail using a series of examples, but the present invention is in no way limited by these examples.

The components shown in Tables 1 to 4 were mixed in the proportions (% by mass) shown in the tables, and each mixture was then melt-kneaded and extruded at a cylinder temperature of 280° C. using a twin-screw extruder (TEX44αII manufactured by Japan Steel Works, Ltd.), thus obtaining pellets of a polybutylene terephthalate resin composition. Details of each of the components used are listed below.

(1) Polybutylene Terephthalate Resins (PBT Resins)
   PBT resin 1: a PBT resin of intrinsic viscosity (IV)=0.68 dl/g, manufactured by WinTech Polymer Ltd.
   PBT resin 2: a PBT resin of intrinsic viscosity (IV)=0.78 dL/g, manufactured by WinTech Polymer Ltd.
   PBT resin 3: a PBT resin of intrinsic viscosity (IV)=0.88 dL/g, manufactured by WinTech Polymer Ltd.
   PBT resin 4: a PBT resin of intrinsic viscosity (IV)=1.14 dl/g, manufactured by WinTech Polymer Ltd.,
   Modified PBT resin: a 30 mol % isophthalic acid-modified PBT resin of intrinsic viscosity (V)=0.90 dl/g, manufactured by WinTech Polymer Ltd.

(2) Silicone-Based Compounds
   Silicone-based compound 1: a dimethylpolysiloxane having a kinematic viscosity at 25° C. of 5,000 cSt
   Silicone-based compound 2: a dimethylpolysiloxane-containing cured silicone powder (silicone powder content: 40% by mass) having a kinematic viscosity at 25° C. of 60,000 cSt
   Silicone-based compound 3: a dimethylpolysiloxane having a kinematic viscosity at 25° C. of 60,000 cSt
   Silicone-based compound 4: a dimethylpolysiloxane having a kinematic viscosity at 25° C. of 1,000 cSt
   Silicone-based compound 5: a dimethylpolysiloxane having a kinematic viscosity at 25° C. of 100 cSt (3) Elastomers
   Elastomer 1: an EEA copolymer (ethylene content: 75% by mass, melting point: 91° C.)
   Elastomer 2: an acrylic-based core-shell polymer (PARALOID EXL231, manufactured by Rohm and Haas Japan Co., Ltd.)

(4) Filler
   Glass fiber (GF): ECS03T-127, manufactured by Nippon Electric Glass Co., Ltd. (average fiber diameter: 13 μm, average fiber length: 3 mm)

(5) Others
   Hydrolysis resistance improver (epoxy resin): Epikote JER1004K, manufactured by Mitsubishi Chemical Corporation.
   Antioxidant: Irganox 1010 manufactured by BASF Japan Ltd.
   Colorant (carbon black): Raven UV Ultra manufactured by Columbian Carbon Japan, Ltd.

<Evaluations>
(1) Alkali Resistance

The obtained polybutylene terephthalate resin composition pellets were dried at 140° C. for 3 hours, and were then subjected to injection molding at a cylinder temperature of 250° C. and a mold temperature of 70° C. to produce a molded piece having a flat sheet shape with a thickness of 1 mmt and a length along one side of 120 mm and having a weld. This molded piece was then cut into a narrow strip to produce a test piece having a width of 10 mm and a length of 100 mm in which the weld was positioned along substantially the central portion of the lengthwise direction. This test piece was secured to a jig in a bent state so that a 1.0% bending strain was applied continuously to the weld. With this state maintained, the entire jig was immersed in a 10% by mass aqueous solution of sodium hydroxide and left to sit at an ambient temperature of 23° C., and inspections as to whether or not cracking had developed in the test piece were conducted at prescribed intervals. The evaluation was performed using three test pieces formed using the pellets of each of the examples and comparative examples, and the time taken for cracking to appear in at least one of the three test pieces was ascertained. The evaluation results for 12 hours after the start of the immersion, 24 hours after the start of the immersion and 48 hours after the start of the immersion are shown in Tables 1 to 4. An A grade means no cracking was observed in any of the three test pieces, whereas a B grade means cracking had occurred in at least one of the three test pieces.

(2) Heat Shock Resistance

Figure 2:
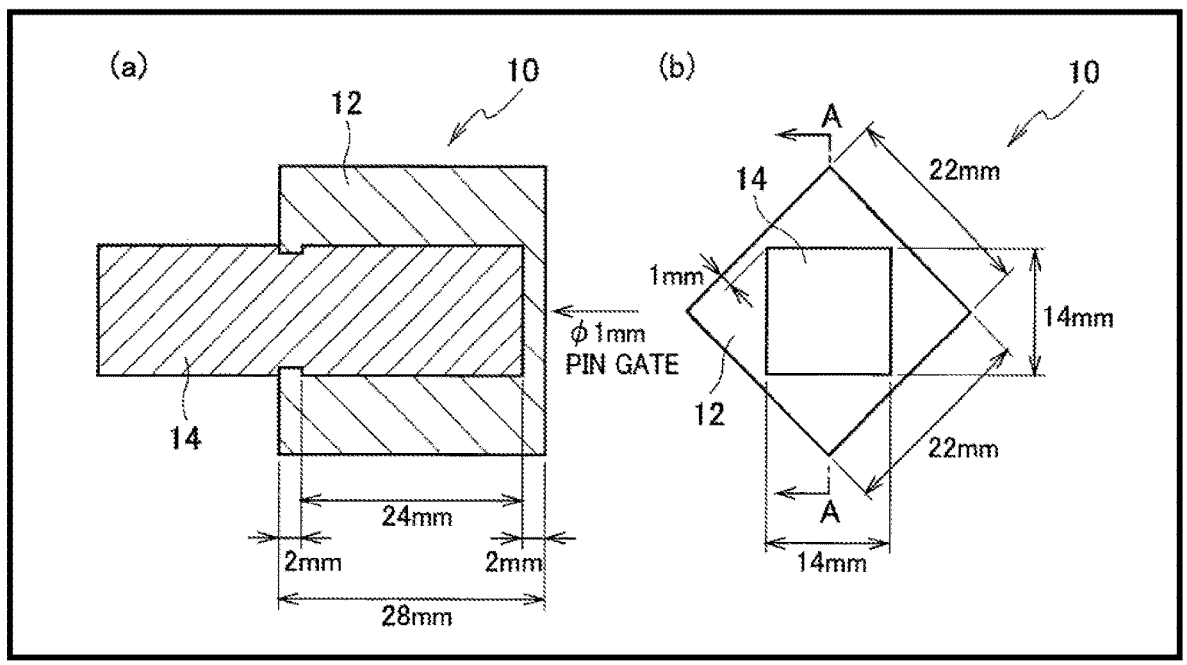
FIG. 2 is (a) a cross-sectional view and (b) a top view illustrating the insert molded article illustrated in FIG. 1.

The obtained polybutylene terephthalate resin composition pellets were dried at 140° C. for 3 hours, and an insert molded article was then produced by using a mold for test piece molding (a mold having a prism-shaped interior with a length of 22 mm, a width of 22 mm and a height of 28 mm, into which an iron core with a length of 14 mm, a width of 14 mm and a height of 24 mm is inserted) to perform insert injection molding under conditions including a cylinder temperature of 250° C., a mold temperature of 70° C., an injection time of 15 seconds and a cooling time of 10 seconds, so that the minimum wall thickness in part of the resin portion was 1 mm. The thus produced insert molded article is illustrated in FIG. 1 and FIG. 2. The insert molded article 10 illustrated in FIG. 1 is a perspective view showing the insert molded article having an iron core 14 inserted in a resin portion 12, and FIG. 2 illustrates additional views of the inserted molded article, with (a) representing a cross-sectional view (a cross-sectional view along the line A-A in (b)), and (b) representing a top view. As illustrated in FIG. 2(a), the portion of the iron core 10 from 24 to 26 mm from the bottom surface of the core is a circular cylindrical shape. Further, as illustrated in FIG. 2(b), the minimum wall thickness of the resin portion 12 surrounding the iron core 14 is 1 mm. The pin gate used for injecting the resin is in a central location in the bottom surface of the resin portion illustrated by an arrow in FIG. 2(a). The obtained insert molded article was subjected to heat shock resistance testing using a thermal shock tester in which the process of heating at 140° C. for 1 hour and 30 minutes, subsequently lowering the temperature to −40° C. and performing cooling for 1 hour and 30 minutes, and then raising the temperature back to 140° C. was deemed one cycle, and the number of cycles performed before cracking appeared in the molded article was measured. The average fracture lifespan was determined across five samples, and this average value was used to evaluate the heat shock resistance. The results are shown in Tables 1 to 4.

(3) Bleeding Resistance

A narrow strip test piece having a width of 10 mm and a length of 100 mm obtained in the same manner as that described above for the evaluation of the alkali resistance but prior to immersion in the aqueous solution of sodium hydroxide was left to stand at 140° C. for 20 hours in a gear oven manufactured by Toyo Seiki Seisaku-Sbo, Ltd., and the test piece was inspected visually and evaluated for bleeding of the silicone-based compound. An evaluation grade of A means no bleeding, B means slight bleeding, and C means marked bleeding. The results are shown in Tables 1 to 4.

TABLE 1

| | | Examples | | | | | | |
|---|---|---|---|---|---|---|---|---|
| | | 1 | 2 | 3 | 4 | 5 | 6 | 7 |
| PBT resin 1 (IV = 0.68) | | 57.2 | | | | 56.8 | 57.2 | 47.2 |
| PBT resin 2 (IV = 0.78) | | | | 54.7 | | | | |
| PBT resin 3 (IV = 0.88) | | | 57.2 | | 52.2 | | | |
| PBT resin 4 (IV = 1.14) | | | | | | | | |
| Modified PBT resin | | | | | | | | 10 |
| Silicone-base compound 1 (viscosity: 5,000 cSt) | | 1.2 | 1.2 | 1.2 | 1.2 | 1.6 | | 1.2 |
| Silicone-base compound 2 (viscosity: 60,000 cSt, powder: 40% by mass) | | | | | | | | |
| Silicone-base compound 3 (viscosity: 60,000 cSt) | | | | | | | | |
| Silicone-base compound 4 (viscosity: 1,000 cSt) | | | | | | | 1.2 | |
| Silicone-base compound 5 (viscosity: 100 cSt) | | | | | | | | |
| Elastomer 1 (EEA copolymer) | | 10 | 10 | 12.5 | 15 | 10 | 10 | 10 |
| Elastomer 2 (acrylic-based core-shell polymer) | | | | | | | | |
| Filler (glass fiber) | | 30 | 30 | 30 | 30 | 30 | 30 | 30 |
| Hydrolysis resistance improver (epoxy resin) | | 1 | 1 | 1 | 1 | 1 | 1 | 1 |
| Antioxidant | | 0.3 | 0.3 | 0.3 | 0.3 | 0.3 | 0.3 | 0.3 |
| Colorant (carbon black) | | 0.3 | 0.3 | 0.3 | 0.3 | 0.3 | 0.3 | 0.3 |
| Alkali resistance (cracking occurrence time) | 12 hr | A | A | A | A | A | A | A |
| | 24 hr | A | A | A | A | A | A | A |
| | 48 hr | A | A | A | A | A | A | A |
| Heat shock resistance (number of cycles) | | 170 | 360 | 230 | 170 | 200 | 170 | 200 |
| Bleeding resistance | | A | A | A | A | B | B | A |

TABLE 2

| | | Comparative Examples | | | | | | | |
|---|---|---|---|---|---|---|---|---|---|
| | | 1 | 2 | 3 | 4 | 5 | 6 | 7 | 8 |
| PBT resin 1 (IV = 0.68) | | 56.4 | 46.4 | 58.4 | 53.4 | | 48.4 | 57.2 | 56.4 |
| PBT resin 2 (IV = 0.78) | | | | | | | | | |
| PBT resin 3 (IV = 0.88) | | | | | | | | | |
| PBT resin 4 (IV = 1.14) | | | | | | 53.4 | | | |
| Modified PBT resin | | | 10 | | | | 10 | | |
| Silicone-base compound 1 (viscosity: 5,000 cSt) | | | | | | | | 1.2 | 2 |
| Silicone-base compound 2 (viscosity: 60,000 cSt, powder: 40% by mass) | | 2 | 2 | | | | | | |
| Silicone-base compound 3 (viscosity: 60,000 cSt) | | | | | | | | | |
| Silicone-base compound 4 (viscosity: 1,000 cSt) | | | | | | | | | |
| Silicone-base compound 5 (viscosity: 100 cSt) | | | | | | | | | |
| Elastomer 1 (EEA copolymer) | | 10 | 10 | 10 | 15 | 15 | 10 | | |
| Elastomer 2 (acrylic-based core-shell polymer) | | | | | | | | 10 | 10 |
| Filler (glass fiber) | | 30 | 30 | 30 | 30 | 30 | 30 | 30 | 30 |
| Hydrolysis resistance improver (epoxy resin) | | 1 | 1 | 1 | 1 | 1 | 1 | 1 | 1 |
| Antioxidant | | 0.3 | 0.3 | 0.3 | 0.3 | 0.3 | 0.3 | 0.3 | 0.3 |
| Colorant (carbon black) | | 0.3 | 0.3 | 0.3 | 0.3 | 0.3 | 0.3 | 0.3 | 0.3 |
| Alkali resistance (cracking occurrence Time) | 12 hr | A | A | B | B | B | B | B | A |
| | 24 hr | A | A | — | — | — | — | — | A |
| | 48 hr | B | B | — | — | — | — | — | A |
| Heat shock resistance (number of cycles) | | | | 140 | 80 | 50 | | 180 | 200 |
| Bleeding resistance | | A | A | A | A | A | A | A | C |

TABLE 3

| | Comparative Examples | | | | | | | |
|---|---|---|---|---|---|---|---|---|
| | 9 | 10 | 11 | 12 | 13 | 14 | 15 | 16 |
| PBT resin 1 (IV = 0.68) | 54.3 | 52.2 | 51.4 | 47.2 | 51.4 | 56.4 | | 46.7 |
| PBT resin 2 (IV = 0.78) | | | | | | | | |
| PBT resin 3 (IV = 0.88) | | | | | | | | |
| PBT resin 4 (IV = 1.14) | | | | | | | 46.4 | |
| Modified PBT resin | | | | 10 | 10 | 10 | 10 | 10 |
| Silicone-base compound 1 (viscosity: 5,000 cSt) | 1.6 | 1.2 | 2 | 1.2 | | | | |
| Silicone-base compound 2 (viscosity: 60,000 cSt, powder: 40% by mass) | | | | | 2 | 2 | 2 | 2 |
| Silicone-base compound 3 (viscosity: 60,000 cSt) | | | | | | | | |
| Silicone-base compound 4 (viscosity: 1,000 cSt) | | | | | | | | |
| Silicone-base compound 5 (viscosity: 100 cSt) | | | | | | | | |
| Elastomer 1 (EEA copolymer) | | | | | | | | |
| Elastomer 2 (acrylic-based core-shell polymer) | 12.5 | 15 | 15 | 10 | 10 | 10 | 10 | 10 |
| Filler (glass fiber) | 30 | 30 | 30 | 30 | 25 | 20 | 30 | 30 |
| Hydrolysis resistance improver (epoxy resin) | 1 | 1 | 1 | 1 | 1 | 1 | 1 | 1 |
| Antioxidant | 0.3 | 0.3 | 0.3 | 0.3 | 0.3 | 0.3 | 0.3 | 0.3 |
| Colorant (carbon black) | 0.3 | 0.3 | 0.3 | 0.3 | 0.3 | 0.3 | 0.3 | |
| Alkali resistance (cracking occurrence time) 12 hr | A | A | A | A | B | B | B | B |
| 24 hr | A | A | A | A | — | — | — | — |
| 48 hr | A | A | A | B | — | — | — | — |
| Heat shock resistance (number of cycles) | 160 | 110 | 110 | | | | | |
| Bleeding resistance | C | A | C | A | A | A | A | A |

TABLE 4

| | Comparative Examples | | | | | | |
|---|---|---|---|---|---|---|---|
| | 17 | 18 | 19 | 20 | 21 | 22 | 23 |
| PBT resin 1 (IV = 0.68) | 56.4 | 51.4 | 46.4 | 47.2 | 48.4 | 43.4 | 57.2 |
| PBT resin 2 (IV = 0.78) | | | | | | | |
| PBT resin 3 (IV = 0.88) | | | | | | | |
| PBT resin 4 (IV = 1.14) | | | | | | | |
| Modified PBT resin | | | 10 | 10 | 10 | 10 | |
| Silicone-base compound 1 (viscosity: 5,000 cSt) | | | | | | | |
| Silicone-base compound 2 (viscosity: 60,000 cSt, powder: 40% by mass) | 2 | 2 | 2 | | | | |
| Silicone-base compound 3 (viscosity: 60,000 cSt) | | | | 1.2 | | | |
| Silicone-base compound 4 (viscosity: 1,000 cSt) | | | | | | | |
| Silicone-base compound 5 (viscosity: 100 cSt) | | | | | | | 1.2 |
| Elastomer 1 (EEA copolymer) | | | | | | | 10 |
| Elastomer 2 (acrylic-based core-shell polymer) | 10 | 15 | 10 | 10 | 10 | 15 | |
| Filler (glass fiber) | 30 | 30 | 30 | 30 | 30 | 30 | 30 |
| Hydrolysis resistance improver (epoxy resin) | 1 | 1 | 1 | 1 | 1 | 1 | 1 |
| Antioxidant | 0.3 | 0.3 | 0.3 | 0.3 | 0.3 | 0.3 | 0.3 |
| Colorant (carbon black) | 0.3 | 0.3 | 0.3 | 0.3 | 0.3 | 0.3 | 0.3 |
| Alkali resistance (cracking occurrence Time) 12 hr | A | A | A | B | B | B | |
| 24 hr | A | A | A | — | — | — | |
| 48 hr | B | B | B | — | — | — | |
| Heat shock resistance (number of cycles) | | | 200 | | | | |
| Bleeding resistance | A | A | A | A | A | A | C |

As illustrated in Tables 1 to 4, it is evident that by using the polybutylene terephthalate resin compositions of Examples 1 to 7, molded articles having excellent alkali resistance and heat shock resistance are able to be obtained. Further, as illustrated by comparisons between Comparative Examples 1 and 17, and Comparative Examples 2 and 19, when the kinematic viscosity of the silicone-based compound is outside of a range from 1,000 to 10,000 cSt, almost no change in the alkali resistance occurs even when the elastomer is changed, whereas when a silicone-based compound having a kinematic viscosity within the range from 1,000 to 10,000 cSt is used, using an olefin-based elastomer yields the unexpected effect of providing a significant improvement in the alkali resistance, as illustrated by a comparison of Example 1 and Comparative Example 7. When the amount added of the silicone-based compound is increased as in Comparative Examples 8 and 9, the alkali resistance and heat shock resistance can be improved even when using an elastomer that is not an olefin-based elastomer, but bleeding problems make the products unsuitable for practical use.

INDUSTRIAL APPLICABILITY

By using the polybutylene terephthalate resin composition according to an embodiment of the present invention, molded articles having excellent alkali resistance and heat shock resistance can be obtained, and therefore the composition can be used favorably in a wide range of fields including electrical and electronic components, vehicle components and general goods, and can be used particularly favorably for insert molded articles used in applications where contact with alkali solutions may occur.

The invention claimed is:

1. A polybutylene terephthalate resin composition comprising:
   a polybutylene terephthalate resin,
   a silicone-based compound having a kinematic viscosity at 25° C. of 3,000 to 6,000 cSt, in an amount of 0.5 to 1.3% by mass of a total mass of the polybutylene terephthalate resin composition, and
   an olefin-based elastomer in an amount of 5 to 20% by mass of a total mass of the polybutylene terephthalate resin composition, wherein the olefin-based elastomer comprises an ethylene-ethyl acrylate copolymer.

2. The polybutylene terephthalate resin composition according to claim 1, wherein the silicone-based compound comprises a dimethylpolysiloxane.

3. The polybutylene terephthalate resin composition according to claim 1, further comprising a filler in an amount of 10 to 50% by mass of a total mass of the polybutylene terephthalate resin composition.

4. The polybutylene terephthalate resin composition according to claim 3, wherein the filler comprises glass fiber.

5. A molded article molded using the polybutylene terephthalate resin composition according to claim 1.

6. The molded article according to claim 5, wherein the molded article is an insert molded article comprising an insert member containing at least one selected from the group consisting of a metal and an inorganic solid.

7. The molded article according to claim 5, wherein the molded article is used in a component that makes contact with an alkali solution.

8. The polybutylene terephthalate resin composition according to claim 1, wherein the polybutylene terephthalate resin composition consists of the polybutylene terephthalate resin, the silicone-based compound, the olefin-based elastomer, and at least one selected from the group consisting of a filler, an antioxidant, a stabilizer, a molecular weight adjuster, an ultraviolet absorber, an antistatic agent, a colorant, a lubricant, a mold release agent, a crystallization promoter, a crystal nucleating agent, an infrared absorber, a flame retardant assistant, a hydrolysis resistance improver, and a fluidity improver.

* * * * *